United States Patent Office 2,804,468
Patented Aug. 27, 1957

2,804,468

PREPARATION OF DICYCLOPENTADIENYLIRON COMPOUNDS

Fred S. Arimoto, New Castle, Del., assignor to E. I. du Pont de Nemours and Company, Wilmington, Del., a corporation of Delaware No Drawing. Application October 1, 1954, Serial No. 459,855

8 Claims. (Cl. 260—439)

This invention relates to a process for the preparation of organo-iron compounds and more particularly to a new and improved process for the preparation of dicyclopentadienyliron and lower alkyl derivatives thereof.

This application is a continuation-in-part of my copending U. S. application, Serial No. 418,223, now abandoned, filed March 23, 1954, and assigned to the assignee of the present application.

Dicyclopentadienyliron and the lower alkyl derivatives thereof have utility as anti-knock agents for spark ignition engines and have been manufactured heretofore by several processes; however, all of the prior art processes have one or more serious disadvantages which makes commercial production highly uneconomical. For example, dicyclopentadienyliron was first prepared by Kealy and Pauson, Nature, 168, 1039 (1951) by reaction of a cyclopentadienylmagnesium halide with anhydrous ferric chloride in ether. This process is obviously disadvantageous in that a volatile and highly inflammable solvent is employed. Hobbs, in copending application, Serial No. 312,658, filed October 1, 1952, describes a process for dicyclopentadienyliron in which cyclopentadienyl sodium is reacted with an iron salt in an inert solvent such as ether. Here too, a volatile solvent is employed and thus presents a safety hazard for any commercial process in which it is used. Still another method of making dicyclopentadienyliron which involves the reaction between cyclopentadiene and iron pentacarbonyl, is described by Anzilloti and Weinmeyr, in copending application, Serial No. 292,388, filed June 7, 1952. Although this method is suitable for large scale production, it involves the use of highly toxic iron pentacarbonyl. Miller, Treboth and Tremaine have described a process for dicyclopentadienyliron in Journal of the Chemical Society (London), February 1952, pages 632–635, in which cyclopentadiene is reacted with a reduced doubly promoted ammonia catalyst. This process however has the very serious disadvantage of becoming inactive and failing to produce dicyclopentadienyliron after just a few minutes operation. Finally, a process for dicyclopentadienyliron has been disclosed by Graham and Whitman in copending application, Serial No. 319,602, filed November 8, 1952, in which the iron compound is prepared directly from cyclopentadiene and an iron source. In the process of Graham and Whitman cyclopentadiene is reacted in the vapor phase with pyrophoric ferrous oxide at temperatures of about 300–450° C., and although the method does represent a definite improvement over previous prior art methods, it suffers from the fact that it requires the additional step of preparing the pyrophoric ferrous oxide by the pyrolysis of ferrous salts of carbon-containing acids.

This invention has as an object to provide a new and improved process for the preparation of dicyclopentadienyliron and lower alkyl derivatives thereof. A further object is to provide a new and improved direct process for the preparation of dicyclopentadienyliron and lower alkyl derivatives thereof from cyclopentadiene or dicyclopentadiene and lower alkyl derivatives thereof and an iron source. A still further object is to provide an economical and commercial process for dicyclopentadienyliron and lower alkyl derivatives thereof which is continuous for long periods of time. Other objects will appear hereinafter.

These objects are accomplished by the following invention of passing a gaseous mixture of cyclopentadiene or dicyclopentadiene and a reducing gas over ferric oxide and condensing the vapors of dicyclopentadienyliron formed in the reaction chamber. In the same manner a gaseous mixture of lower alkyl cyclopentadiene and a reducing gas may be passed over ferric oxide to obtain the corresponding bis(lower alkylcyclopentadienyl) iron. As generally practiced, the process of this invention is carried out quite simply and economically and without the use of complex equipment. Essentially all that is required is a reaction chamber which consists of a silicious or metal tube containing ferric oxide and into which cyclopentadiene and hydrogen is passed. The reaction chamber is maintained at about 275 to 400° C. and as the dicyclopentadienyliron is formed, it sublimes from the reaction chamber and can be condensed by cooling vapor. The product is of extremely high purity available for immediate use.

The following examples will better illustrate the nature of the present invention; however, the invention is not intended to be limited to these examples. Parts are by weight unless otherwise specified.

EXAMPLE I.—FORMATION OF DICYCLOPENTADIENYLIRON AT VARIOUS MOLE RATIOS OF HYDROGEN TO CYCLOPENTADIENE

Reagent grade ferric oxide (10 g.) is mixed with glass beads (112 g.) of approximately $3/16$ in. diameter, in order to increase the surface of the oxide available for reaction and placed in a reactor tube. The reactor tube consists of "Pyrex" glass tubing 1 in. in diameter, 25 in. long, having standard ground glass joints. The mixture of glass beads and ferric oxide is kept in place by means of a glass wool plug and placed approximately 4 in. from the end of the reaction tube. The tube is placed in a horizontal electric heater and heated to 300° C. while maintaining a hydrogen flow of 250 cc. per minute through the reaction tube. The hydrogen flow is measured by means of a calibrated flow meter. The hydrogen flow is maintained for about 20 minutes and is then reduced to 85 cc. per minute, and is diverted in such a way that prior to entering the reaction chamber it is now bubbled through cyclopentadiene (100 g.) at 0° C. The ratio of hydrogen to cyclopentadiene in the feed stream is varied conveniently by using different temperatures of cyclopentadiene. The formation of dicyclopentadienyliron is evident after about 3 minutes and during the 5 hours that the reaction is carried out, 34.4 g. of cyclopentadiene is used of which 25.7 g. is recovered in a trap immersed in a Dry Ice acetone bath. 5.04 grams of dicyclopentadienyliron is collected in the flask which acts as a condenser at the exit end of the reaction tube.

The following table lists the results obtained by varying the ratio of hydrogen to cyclopentadiene (CPD):

*Dicyclopentadienyliron formation*

[Temperature 300° C.]

| Temperature of cyclopentadiene, ° C. | H₂ (cc./min.) | Mole Ratio, H₂/cyclopentadiene | Dicyclopentadienyliron formed (mg./min.) | Percent Conversion (based on CPD) | Percent Yield (Based on CPD) |
|---|---|---|---|---|---|
| 25 | 42 | 0.5 | 15 | 58.2 | 7.4 |
| 20 | 85 | 1.24 | 24 | 33.6 | 27.1 |
| 0 | 85 | 2.0 | 17 | 25.3 | 41.2 |
| −20 | 85 | 4.42 | 8 | 38.6 | 26.6 |
| 0 | ¹ 320 | 5.97 | 17 | 42.4 | 19.1 |

¹ Two hydrogen streams used here: one passing through cyclopentadiene at 85 cc./min. and the second, hydrogen alone at 235 cc./min.

EXAMPLE II.—FORMATION OF BIS(METHYLCYCLOPENTADIENYL)IRON

Reagent grade ferric oxide (10 g.) is mixed with glass beads as in Example I and placed in the reactor tube. The reaction tube is placed in a horizontal electric heater and brought to 300° C. while maintaining a hydrogen flow of 250 cc. per minute. When the temperature of 300° C. has been reached, the hydrogen flow is maintained for additional 10 minutes and then reduced to 85 cc. per minute and at the same time the dimer of methylcyclopentadiene is added at the rate of 1 drop every 40 secs. into a flask kept at 260°–280° C. The flask into which the dimer of methylcyclopentadiene is dropped is arranged in such a way that the stream of hydrogen would sweep out the vaporized material and carry it along into the reactor tube. During the 4 hours of reaction 10.5 g. of the dimer of methylcyclopentadiene is used of which 7 g. is recovered in trap immersed in a Dry Ice-acetone bath. The weight of bis(methylcyclopentadienyl)iron obtained in this manner is 1.3 g. which represents 33.5% conversion and 27.8% yield. The identity of bis(methylcyclopentadienyl)iron was established by the comparison of the infrared spectra of the product obtained in this manner with that of the product obtained by the Grignard method of Kealy and Pauson (Nature 168, 1039 (1951)) using methylcyclopentadiene instead of cyclopentadiene. The infrared spectra were identical in all respects.

EXAMPLE III.—EFFECT OF TEMPERATURE ON DICYCLOPENTADIENYLIRON FORMATION

Reagent grade ferric oxide (10 g.) is placed in the reactor tube described in Example I and heated to the desired temperature by the electric heater while maintaining the hydrogen flow of 250 cc. per minute. When the desired temperature is reached, the hydrogen flow is maintained for an additional 10 minutes and is then reduced to 85 cc. per minute. Cyclopentadiene held at 0° C. is entrained in the hydrogen stream as described in Example I and is then brought into the reaction zone together with the hydrogen. The following table summarizes the results obtained.

*Dicyclopentadienyliron formation*

[Effective Temperature]

| CPD, (0° C.) | Hydrogen (cc./min.) | Reaction Temperature, ° C. | Dicyclopentadienyliron Formation |
|---|---|---|---|
| 0 | 85 | 250 | None. |
| 0 | 85 | 275 | Good. |
| 0 | 85 | 400 | Good. |
| 0 | 85 | 450 | None. |

EXAMPLE IV.—EFFECT OF HYDROGEN ON THE ACTIVE LIFE OF THE IRON SOURCE

Reagent grade ferric oxide (10 g.) is placed in the reactor tube described in Example I and heated to 300° C. while maintaining a hydrogen flow of 250 cc. per minute. When the temperature of 300° C. was reached, the hydrogen flow of 250 cc. per minute is maintained 30 minutes more. The hydrogen flow is then turned off and nitrogen at a rate of 85 cc. per minute is bubbled through cyclopentadiene at 0° C. and then into the reactor tube. The results obtained using nitrogen as a carrier are given in the following table and for comparison, the results obtained by using hydrogen at 85 cc. per minute are also given:

*Dicyclopentadienyliron formation*

[Mg./minute]

| | Cyclopentadiene at 0° C. | |
|---|---|---|
| Time (Hrs.) | Cyclopentadiene and Nitrogen (85 cc./min.) | Cyclopentadiene and Hydrogen (85 cc./min.) |
| ¼ | 1.7 | 16 |
| ½ | 3.1 | 20 |
| ¾ | 1.5 | |
| 1 | 0.7 | 20 |
| 1¼ | 0.3 | |
| 1½ | 0 | 22 |
| 1¾ | 0 | |
| 2 | | 28 |
| 2½ | | 30 |
| 3 | | 23 |
| 3½ | | 19 |
| 4 | | 20 |
| 4½ | | 20 |
| 5 | | 20 |
| 5½ | | 19 |
| 6 | | 16 |

It is evident that even though the ferric oxide is first treated with hydrogen, hydrogen flow must be continued in order to maintain continuous production of dicyclopentadienyliron.

EXAMPLE V.—SYNTHESIS OF DICYCLOPENTADIENYLIRON USING DICYCLOPENTADIENE

Reagent grade ferric oxide (10 g.) is mixed with glass beads as in Example I and placed in the reactor tube. The reactor tube is placed in a verticle electric heater and brought to 325° C. while maintaining a hydrogen flow of 250 cc. per minute. When a temperature of 325° C. has been reached, the hydrogen flow is maintained for an additional 10 minutes, and is then reduced to 85 cc. per minute and at the same time dicyclopentadiene is added dropwise directly to the reactor tube at the rate of approximately 1 drop every 20 seconds. During the 5 hours of the reaction, 19.3 g. of dicyclopentadiene is used of which 11.3 g. is recovered as cyclopentadiene in a trap immersed in Dry Ice-acetone bath. The weight of dicyclopentadienyliron obtained in this manner is 3.15 g. which represents 41.4% conversion and 27.9% yield.

EXAMPLE VI—PREPARATION OF DICYCLOPENTADIENYLIRON FROM FERRIC OXIDE, CYCLOPENTADIENE AND CARBON MONOXIDE

A 1 in. diameter "Pyrex" glass tube 16 in. in length is used as a reaction chamber and is loaded with 10 g. of ferric oxide (no glass beads) as described in Example I. The temperature is brought to 300° C. and carbon monoxide passed over the ferric oxide at a flow rate of 100 cc./min. for 25 minutes. Cyclopentadiene is then added to the gas stream by diverting the carbon monoxide flow through cyclopentadiene at 0° C., just prior to entering the reaction chamber. The cyclopentadiene is vaporized at the rate of 1.33 g./hr. Within 5 minutes of cyclopentadiene flow, dicyclopentadienyliron is formed and after 90 minutes 0.55 g. is formed. This represents a yield of 19.6% based on the cyclopentadiene.

EXAMPLE VII

Ferric oxide (10 g.) is placed in the reaction tube and heated to 300° C. as in Example V. After passing in carbon monoxide for 15 minutes, cyclopentadiene is added to the gas flow. The data follows:

| CO Flow Rate | Cyclopentadiene Flow Rate, g./hr. | Reaction Time, hrs. | Percent Conversion to Dicyclopentadienyliron |
|---|---|---|---|
| 140 cc./min | 6.22 | 5 | 34 |
| 240 cc./min | 3.42 | 3.5 | 67 |

As evidenced by the examples, the significant reaction temperatures for the process of the present invention are from about 275° C. to 400° C.

The cyclopentadiene is introduced into the reaction chamber by allowing the reducing gas to first bubble through cyclopentadiene, thus vaporizing a portion of the liquid and carrying the vapor with it. When methyl cyclopentadiene is used it may be introduced into the reaction chamber in the same manner. The flow rate of the cyclopentadiene can be controlled by adjusting the temperature at which it is held. The lower the temperature the less volatile the cyclopentadiene and therefore the slower the rate at which it is introduced into the reaction chamber. When dicyclopentadiene or the dimer of methyl cyclopentadiene is used it can be added directly to the reaction chamber although other means of introducing it are also possible. The ratio of reducing gas to cyclopentadiene is important only in that some reducing gas must be present. It is believed that the reducing gas is necessary to convert the ferric oxide to an active form, but it is the cyclopentadiene or lower alkyl derivatives thereof which react with the activated iron source to form dicyclopentadienyliron. The preferred molar ratio of reducing gas to cyclopentadiene has been found to be about 1:1 although lower and higher ratios are operable. When the ratio of reducing gas to cyclopentadiene is greater than about 2:1 the amount of reducing gas being used is far above that actually required to produce the active form of the ferric oxide and is thus wasteful. On the other hand, when the ratio is much less than about 1:1, the amount of cyclopentadiene is excessive in that all of it cannot react in the contact time available and a large portion of it must be recycled for reuse.

The commercial materials utilized in the process of the present invention need no purification prior to application in this reaction. Dicyclopentadiene as commercially available readily yields cyclopentadiene which is quite satisfactory, or the dicyclopentadiene itself can be used, allowing cracking to the monomer to occur in the heated reaction tube. In preparing bis(methylcyclopentadienyl)iron, methyl cyclopentadiene, which is readily available as its dimer, may be used as the starting material and may be cracked to the monomer in a manner similar to that described for dicyclopentadiene. Other lower alkyl cyclopentadienes may be used to prepare the corresponding bis(loweralkylcyclopentadienyl)-iron compounds. It is to be understood that lower alkyl is intended to include both straight or branched chain hydrocarbon radicals of from 1 to 4 carbon atoms. Reagent grade ferric oxide is quite satisfactory as is also material obtained directly from iron ore deposits. As examples of a reducing gas, hydrogen and carbon monoxide may be used and obtained from any commercial source, such as from water gas from hydrocarbons as by reaction of steam with methane, or by other known processes. A mixture of reducing gases can also be used for carrying out the process of this invention.

It is believed that the reducing gas converts the ferric oxide to an active form of a magnetic iron oxide which is the actual reagent. This is supported by the fact that after continued operation of the process, the starting non-magnetic ferric oxide in the reaction chamber becomes magnetic and X-ray diffraction studies show no ferrous oxide to be present. It has been determined that unless the reducing gas is present, the production of dicyclopentadienyliron is small and the reaction will stop after a short time of operation. Even if the reducing gas is first passed over the ferric oxide at the normal temperatures of the reaction and cyclopentadiene then passed over while the reducing gas is no longer conducted through the reaction chamber, very little product is obtained and the active life of the iron source is extremely short. It is only by having the gaseous reductant passing over the ferric oxide simultaneously with the cyclopentadiene that the process operates satisfactorily and becomes economical on a large commercial scale.

It is apparent from the preceding description that the process of the present invention is well adapted to commercial use and it avoids the use of expensive and hazardous intermediates and solvents. The product produced by the process of the present invention is valuable as an antiknock agent for fuels employed in spark ignition engines.

As many apparently widely different embodiments of this invention may be made without departing from the spirit and scope thereof, it is to be understood that this invention is not limited to the specific embodiments thereof except as defined in the appended claims.

What is claimed is:

1. A process for the preparation of a dicyclopentadienyliron compound which comprises passing a gaseous mixture of a reducing gas and an organic compound selected from the group consisting of dicyclopentadiene, cyclopentadiene, lower alkyl cyclopentadiene and the dimer of lower alkyl cyclopentadiene over ferric oxide at a temperature of about 275° C. to 400° C. and condensing the vapors of the dicyclopentadienyliron compound thus produced.

2. A process for the preparation of dicyclopentadienyliron which comprises passing a gaseous mixture of hydrogen and cyclopentadiene over ferric oxide at a temperature of about 275° C. to 400° C. and condensing the vapors of dicyclopentadienyliron from the reaction chamber.

3. A process for the preparation of dicyclopentadienyliron which comprises passing a gaseous mixture of carbon monoxide and cyclopentadiene over ferric oxide at a temperature of about 275° C. to 400° C. and condensing the vapors of dicyclopentadienyliron from the reaction chamber.

4. A process for the preparation of bis(lower-alkyl-cyclopentadienyl)iron which comprises passing a gaseous mixture of hydrogen and the dimer of lower alkyl cyclopentadiene over ferric oxide at a temperature of about 275° C. to 400° C. and condensing the vapors of bis-(loweralkylcyclopentadienyl)iron from the reaction chamber.

5. A process for the preparation of bis(loweralkyl-cyclopentadienyl)iron which comprises passing a gaseous mixture of carbon monoxide and the dimer of lower alkyl cyclopentadiene over ferric oxide at a temperature of about 275° C. to 400° C. and condensing the vapors of bis(loweralkylcyclopentadienyl)iron from the reaction chamber.

6. A process for the preparation of bis(methylcyclopentadienyl)iron which comprises passing a gaseous mixture of hydrogen and the dimer of methyl cyclopentadiene over ferric oxide at a temperature of about 275° C. to 400° C. and condensing the vapors of bis(methylcyclopentadienyl)iron from the reaction chamber.

7. A process for the preparation of bis(methylcyclopentadienyl)iron which comprises passing a gaseous mixture of carbon monoxide and the dimer of methyl cyclopentadiene over ferric oxide at a temperature of about 275° C. to 400° C. and condensing the vapors of bis-(methylcyclopentadienyl)iron from the reaction chamber.

8. In the process for the preparation of dicyclopentadienyliron and lower alkyl derivatives thereof the step which comprises passing a gaseous mixture of a reducing gas and an organic compound selected from the group consisting of dicyclopentadiene, a cyclopentadiene, lower alkyl cyclopentadiene and the dimer of lower alkyl cyclopentadiene over ferric oxide at a temperature of about 275° C. to 400° C.

References Cited in the file of this patent

Miller et al.: Jour. Chem. Soc., February 1952, pp. 632–635.

Birmingham et al.: Jour. Amer. Chem. Soc., vol. 76, page 4179, August 20, 1954.